United States Patent
Adam et al.

(10) Patent No.: US 12,552,263 B2
(45) Date of Patent: Feb. 17, 2026

(54) ELECTRIC DRIVE SYSTEM, POWER TRAIN, VEHICLE, AND METHOD OF OPERATING AN ELECTRIC DRIVE SYSTEM

(71) Applicant: Siemens Mobility GmbH, Munich (DE)

(72) Inventors: Christoph Adam, Nuremberg (DE); Matthias Corduan, Nuremberg (DE); Olaf Körner, Nuremberg (DE)

(73) Assignee: Siemens Mobility GmbH, Munich (DE)

( * ) Notice: Subject to any disclaimer, the term of this patent is extended or adjusted under 35 U.S.C. 154(b) by 198 days.

(21) Appl. No.: 18/345,102

(22) Filed: Jun. 30, 2023

(65) Prior Publication Data

US 2024/0001773 A1    Jan. 4, 2024

(30) Foreign Application Priority Data

Jun. 30, 2022 (DE) ...................... 10 2022 206 679.0

(51) Int. Cl.
*H02P 27/04* (2016.01)
*B60L 9/16* (2006.01)
*B60L 15/20* (2006.01)

(52) U.S. Cl.
CPC ................. *B60L 15/20* (2013.01); *B60L 9/16* (2013.01); *B60L 2200/26* (2013.01); *B60L 2210/40* (2013.01)

(58) Field of Classification Search
CPC .......... H02P 25/18; H02P 27/06; H02P 21/22; H02P 2207/05; H02P 25/022; B60L 15/20
See application file for complete search history.

(56) References Cited

U.S. PATENT DOCUMENTS

| | | | |
|---|---|---|---|
| 6,431,297 B1 | 8/2002 | Nakazawa | |
| 11,214,149 B2 | 1/2022 | Koerner | |
| 2019/0123665 A1 | 4/2019 | Apelsmeier et al. | |
| 2020/0262299 A1* | 8/2020 | Ronning | B60L 15/2045 |
| 2021/0296890 A1 | 9/2021 | Schneider | |

FOREIGN PATENT DOCUMENTS

| | | | | |
|---|---|---|---|---|
| CN | 113783490 A | * | 12/2021 | |
| DE | 60027806 T2 | | 12/2006 | |
| DE | 102016207286 A1 | | 11/2017 | |
| DE | 102019120749 A1 | * | 2/2020 | ............... B60K 1/00 |
| EP | 3474434 A1 | | 4/2019 | |
| EP | 3564088 A1 | | 11/2019 | |

* cited by examiner

*Primary Examiner* — Karen Masih
(74) *Attorney, Agent, or Firm* — Laurence A. Greenberg; Werner H. Stemer; Ralph E. Locher

(57) ABSTRACT

An electric drive system for a vehicle, such as a rail vehicle, has a plurality of different drive motors. The motors include at least one permanently excited motor as a drive and at least one further motor selected from the group of asynchronous motor and reluctance motor as a drive motor. The permanently excited motor is powered by an inverter whose power semiconductor has a greater band gap than silicon, and the further motor which is selected from the group of asynchronous motor and reluctance motor is powered by an Si inverter.

9 Claims, 1 Drawing Sheet

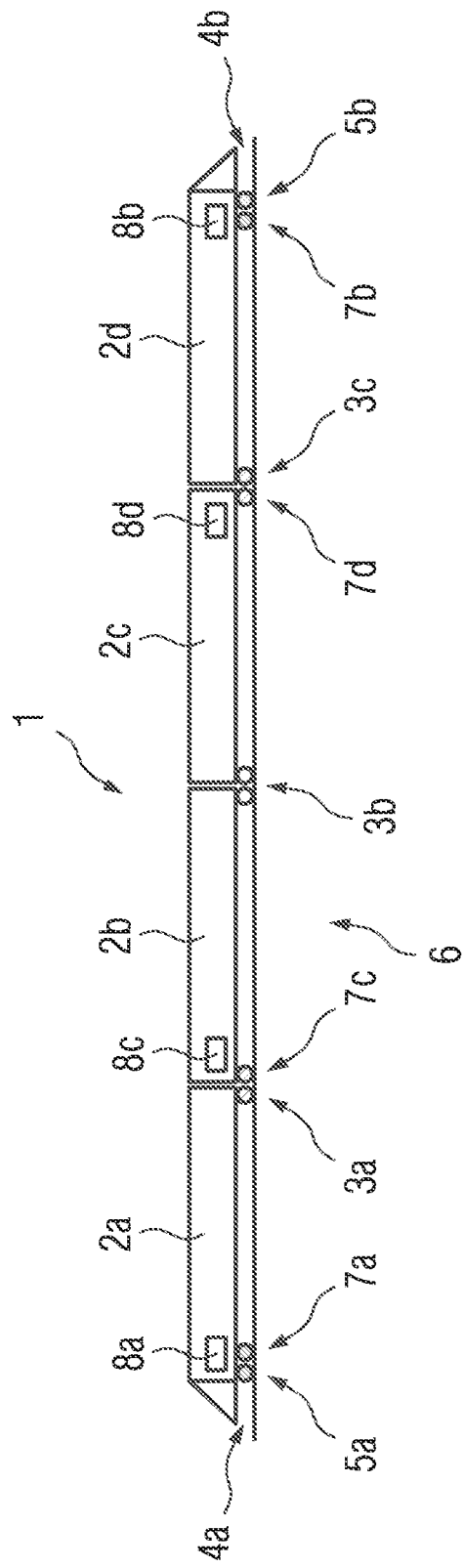

ELECTRIC DRIVE SYSTEM, POWER TRAIN, VEHICLE, AND METHOD OF OPERATING AN ELECTRIC DRIVE SYSTEM

CROSS-REFERENCE TO RELATED APPLICATION

This application claims the priority, under 35 U.S.C. § 119, of German Patent Application DE 10 2022 206 679.0, filed Jun. 30, 2022; the prior application is herewith incorporated by reference in its entirety.

FIELD AND BACKGROUND OF THE INVENTION

The present invention relates to an electric drive system. The present invention relates, in particular, to an electric drive system, which advantageously uses different electric machines for a drive.

Electric machines are known as generators and/or electric motors. The advantages of permanent magnet synchronous motors (PSM) lie in the comparatively low rotor losses and therewith improved efficiency compared, for instance, to the asynchronous machine. Furthermore, permanent magnet synchronous motors can also have a higher-pole construction than the asynchronous machine without adversely affecting the power factor. The higher-pole capacity of the permanent magnet-synchronous motors results in improved torque and power densities with given assembly spaces and also makes it possible to implement gearless drives. Furthermore, asynchronous motors and reluctance motors are known, which are less effective in the delivery of power but exhibit low losses, particularly in partial-load operation or with load-free rolling phases.

U.S. Pat. No. 11,214,149 B2 and its counterpart European published patent application EP 3 564 088 A1 describe a drive system for a rail vehicle having a plurality of drive motors. In that drive system it is provided that it has at least one permanent magnet-excited motor and at least one asynchronous motor and/or at least one reluctance motor as the drive motors.

Solutions of this kind still have further potential for improvement, however.

SUMMARY OF THE INVENTION

It is accordingly an object of the invention to provide an electric drive system which overcomes the above-mentioned disadvantages of the heretofore-known devices and methods of this general type and which remedies, at least in part, the drawbacks known from the prior art. It is, in particular, the object of the present invention to provide a solution by way of which the energy consumption of an electric drive system can be further improved.

With the above and other objects in view there is provided, in accordance with the invention, an electric drive system for a rail vehicle, the drive system comprising:
- a plurality of drive motors, including at least one permanently excited motor and at least one further motor selected from the group consisting of an asynchronous motor and a reluctance motor;
- an inverter for powering said permanently excited motor, said inverter having a power semiconductor with a band gap wider than a band gap of silicon; and
- an Si inverter for powering said further motor selected from the group consisting of the asynchronous motor and the reluctance motor.

In other words, there is described an electric drive system for a rail vehicle, having a plurality of drive motors, wherein the drive system comprises at least one permanently excited motor and at least one further motor selected from the group comprising asynchronous motor and reluctance motor as the drive motor, wherein the permanently excited motor is powered by an inverter whose power semiconductor has a greater band gap than silicon, and the further motor selected from the group comprising asynchronous motor and reluctance motor is powered by an Si inverter, an Si-based inverter.

An embodiment of this kind particularly advantageously allows energy to be conserved during operation of a power train, in particular for railroad vehicles, which may also be referred to as rail vehicles.

During operation of rail vehicles, in particular in the case of commuter trains and regional trains, movement phases between two stations are subdivided into four movement sections: acceleration, cruising, rolling/coasting and braking.

The acceleration range is characterized by a drive power of the rail vehicle and a transfer of the drive forces to the wheels of the rail vehicle. As long as a tractive force of the drive of the rail vehicle is greater than a tractive resistance that it is met with, the rail vehicle accelerates.

The cruising section is achieved if tractive force and tractive resistance or tractive resistance force corelate with opposite signs.

In a rolling phase or in the coasting section the tractive force is withdrawn to the extent that the rail vehicle reduces its traveling speed owing to the tractive resistance. If additional braking forces are used the coasting section transitions into the braking section.

The interaction between the above-mentioned sections or phases of a journey of the rail vehicle is also referred to as the operational cycle.

In the operational cycles between the individual stations, a partial-load operation or even driveless rolling phases occur in the phases of cruising, rolling/coasting and mechanical braking for the drive motor(s). Operation with, for example, 0 to 50 percentage points of the total drive power installed on the vehicle side takes place over a relatively large proportion of time of the total trip duration between two stations. A high tractive force and drive power is required out of the stations in the acceleration phase, however, and often also in regenerative braking. This high tractive force and drive power determine the total number of driven wheelsets and the installed (short-term) drive power. This high drive power is no longer required during the remaining phases of the operational cycles, except for possible regenerative braking, however.

When asynchronous machines are used as drive motors it is possible for individual drive motors, and therewith driven wheelsets, to be shut down by means of clock inhibitions of individual power converters, which provide the motors with electric power. Electromagnetic losses no longer occur in the shutdown asynchronous machines. The power converter clock inhibition also prevents losses in the power semiconductors used (switching losses and transmission losses) in partial-load operation. The remaining active drive motors are operated close to a full-load point whereby higher efficiency rates may be achieved.

A clock inhibition is not possible, or is only possible up to a particular permissible voltage, with permanently excited motors, or at least does not result in an electromagnetically lossless machine since the rotating permanent magnet flux continues to induce eddy current and hysteresis losses in the ferrite core used in the machine.

For said reasons the result of a comparison of the energy consumption between asynchronous machines and permanently excited motors in operational cycles having long rolling or coasting phases is that the permanently excited motors cannot conserve energy, or even achieve a poorer energy balance.

With partial-load operation of the rail vehicle to be driven the drive system can advantageously shut down the more lossy asynchronous and/or reluctance motors in this load range. In contrast to the asynchronous motor or the reluctance motor the permanent magnet excitation allows high efficiency rates and power factors even in lower power ranges, or can be operated at a high load depending on the proportion of the machine types and the required total drive power.

The combination of permanent magnet-excited motors and asynchronous motors and/or reluctance motors as the drive motors allows the asynchronous motors and/or reluctance motors to be switched on, in addition to the permanent magnet-excited motors, for the peak-load ranges during the acceleration phase to facilitate a maximum tractive force and drive power.

The invention therefore makes it possible to combine the advantages of permanent magnet-excited motors, in particular of high efficiency even in partial-load operation therefore, and of asynchronous motors and/or reluctance motors, namely simple loss-free shutdown capacity, and to provide an energy consumption-efficient drive system.

The drive system is accordingly configured in such a way that the different motors act on a wheelset axle or an individual wheel.

It is also provided that the permanently excited motor is powered by an inverter whose power semiconductor has a wider band gap than silicon, and whose band gap therefore lies, in particular, in a range of ≥1.3 eV, for example ≥1.8 eV, preferably ≥2.2 eV. This can be implemented, for example without problems, by way of the selection of its design, in particular by the selection of its semiconductor. For example, the inverter can be an SiC inverter, a GaN inverter or a diamond inverter, which all have the previously described band gap. Within the meaning of the invention an SiC inverter should be taken to mean an inverter, which has a silicon carbide power semiconductor, and further of said inverters are similarly named according to their semiconductor material. Furthermore, the further motor selected from the group comprising asynchronous motor and reluctance motor is powered by an Si inverter.

The construction of inverters or pulse inverters is known in principle to those of skill in the art. From the direct voltage supplied by a DC system in conjunction with an optional DCDC chopper or a transformer and input rectifier (4QS) or an HV battery or fuel cell, an inverter generates a usually three-phase alternating voltage (three-phase voltage) for operation of an electric machine.

The low load range in drive operation is fed covered preferably by an SiC inverter via the highly-efficient permanently excited motor. This reduces the battery capacity required for achieving the range requirement. A lower capacity battery can be used in the vehicle, and this results in savings. The lower battery capacity also enables a percentage reduction in the charging time. The total power of the drive system remains the same since the SiC inverter is supplemented, for example, by the Si inverter. The vehicle exhibits the same performance as a vehicle having inverters with the same semiconductor materials.

Basically it is possible, since the permanently excited motor is operated with a greater proportion of time and at higher fundamental frequencies, since it is higher-poled compared to the asynchronous machine or reluctance machine, that the SiC power semiconductor can be optimally used, for example with lower switching losses.

The present invention therefore makes it possible to reduce the energy consumption of railroad vehicles. For the energy consumption of a local transport vehicle, such as a Metro or Commuter Rail, is critical that the drive system causes the smallest possible losses even in loadless rolling phases or partial-load ranges. As described above this is given by the combination of permanently excited motor and, moreover, asynchronous motor and/reluctance motor.

In the overall power train having the inventive drive system the losses in the electric machines (for instance, ASM or PSM) are dominantly based on a real operational cycle with respect to the losses of the other drive components, such as transformer, power converter or gear unit. Optimizations in the electric machines and their operational management, which do not appreciably affect the selection and the losses of the other components, have a great effect on the efficiency of the overall system.

To optimize the energy consumption over the entire drive cycle, for instance with regard to the machine-oriented optimization parameters such as a pulse pattern, pulse frequency, direct current link voltage etc., a possibility has been inventively found, which reinforces the advantages of the respective machine types and lessens the drawbacks. The losses in partial-load phases and rolling phases of a drive system with different machine types, in particular permanently excited motor, asynchronous motor and reluctance motor, and different power semiconductors in the pulse inverters, in particular silicon and silicon-carbide, are minimized as a result. This can be inventively facilitated particularly effectively by selection of the electric machines, in particular in combination with the specifically used semiconductors.

Preferably, the power distribution of the drive motors can be set as a function of at least one anticipated route parameter, environmental parameter or operating parameter. This can be possible, in particular, by way of a control device of the drive system. This embodiment allows a particularly effective reduction in energy since there is no pre-set distribution of the power output that is independent of the route, and instead the latter is dependent on at least one, for example on a wide variety of route parameters, environmental parameters or operating parameters. A power distribution to the different electric machines, a uniform power provision or also defined, non-uniform control, in particular in partial-load operation, can thus be facilitated as a function of the described parameters. An adjustment is thus made to the actually prevailing conditions, and this makes a conservation of energy particularly effective since the route parameters again influence or determine the operational cycle.

Learning algorithms, for instance by means of AI (artificial intelligence), would also be conceivable for continual optimization of the operational management during operation of the vehicle.

In particular, it is thus not merely decided in which phase of the operational cycle the vehicle instantaneously finds itself. Instead further parameters, which similarly have an effect on the power requirement, but go beyond the mere phase of the operational cycle, are heeded, moreover.

With regard to the route parameters, operating parameters, and environmental parameters, it can be particularly advantageous that these are selected from elevation profile of the route, proportion of the individual movement phases of the operational cycle, anticipated load due to weight of the vehicle, ambient and environmental conditions such as weather conditions (track conditions) and ambient temperatures, adherence to the timetable. In particular, route parameters of this kind have an effect on the respective power requirement of the electric machines and therefore can be important for facilitating an effective conservation of energy.

It can also be advantageous that the power delivered by the permanently excited motor in full-load operation lies in a power range, which lies from 100% to 150%, for example from greater than or equal to 100% to 130%, for instance from 110% to 130% in respect of the power, which is delivered by the further motor selected from the group comprising asynchronous motor and reluctance motor. In other words, the power of the permanently excited motor can be increased, in particular in the short-term, with respect to the asynchronous motor and/or reluctance motor. This can be possible, for example in the case of low external temperatures or a short duration, since, in particular, the resulting thermal load does not lead to any damage but can still facilitate a high power with comparatively low energy input. This can again be possible, in particular, by way of a control device of the drive system.

For this, an adjustment of the dimensioning of the drive system, in particular also the pulse inverter, is advantageous for the proposed changed power distribution PSM to ASM/RSM. This enables improved utilization of the semiconductor owing to the additional degree of freedom, and results therewith in the conserving of semiconductors.

It can also be advantageous that in the case of full load, and in particular high tractive and braking forces on the wheel at low traveling speeds, all drive motors provide the same power, with an uncertainty of 5%, based on the greatest value. In other words, the same tractive and braking force can be provided at a wheelset axle or individual wheel substantially by all motors. The wheel/track wear can be reduced as a result and a good reduction in energy can also be facilitated in the case of high power, moreover.

It can also be advantageous that the inverter or pulse inverter (PWR) powers the further motors, if these are asynchronous motors, in parallel. For example, an inverter or a pulse inverter can be provided for two or more electric asynchronous machines. Owing to the selection of the semiconductors this is possible without problems and thus allows a simple and cost-efficient construction.

It can thus also be preferred that a power distribution of the permanently excited machine on the one side and of the further motor selected from the group comprising asynchronous motor and reluctance motor takes place on the basis of a specified efficiency matrix. An efficiency matrix of this kind, in particular heeding corresponding route, operating and environmental parameters, can include, for example, different traveling situations or operating points and respectively specify for a traveling situation which power distribution should take place. In this embodiment it is thus possible to constantly examine the current traveling situation and a corresponding power distribution can be implemented on the basis of the ascertained data. As a result, the optimum power distribution always exists in a highly dynamic manner, and this may reduce the energy consumption particularly effectively and can spare the incorporated components particularly effectively, moreover.

With regard to further advantages and technical features of the electric drive system, reference is hereby made to the description of the power train, the vehicle, the method, the FIGURE and the description of the FIGURE.

A power train for a vehicle is described, moreover, in particular for a rail vehicle, wherein the power train comprises an electric drive system for driving at least one wheel or one wheelset axle, characterized in that the drive system is configured as described above.

For example, the power train can be arranged in a railroad vehicle or rail vehicle or be part of the railroad vehicle, so a good implementation in existing systems and a wide applicability is given. In this case, the power train can comprise the previously described drive system, a gear unit connected to the motors, a wheelset axle and an axle coupling for transferring the drive moment from the gear unit to the wheelset axle. Gearless motors, in particular separate, permanently excited synchronous motors (PSM) here, are also conceivable, however.

The specific advantages of a power train of this kind can be seen, in particular, in that a particularly effective conservation of energy and optimum sparing of the component is facilitated, moreover.

With regard to further advantages and technical features of the power train, reference is hereby made to the description of the electric drive system, the vehicle, the method, the FIGURE and the description of the FIGURE.

A vehicle is described, moreover, wherein the vehicle has at least one of an electric drive system and a power train, as is described above.

For example, the vehicle can be a rail vehicle that is also called railroad vehicle since corresponding power trains or electric drive systems are suitable in particular for vehicles of this kind.

The previously described advantages are also pertinent for a described vehicle, so a particularly effective conservation of energy and optimum sparing of the components, moreover, can be facilitated.

With regard to further advantages and technical features of the vehicle, reference is hereby made to the description of the electric drive system, the power train, the method, the FIGURE and the description of the FIGURE.

A method for operating an electric drive system having a plurality of drive motors is described, moreover, wherein the drive system comprises at least one permanently excited motor and at least one further motor selected from the group comprising asynchronous motor and reluctance motor as the drive motor, and wherein the motors are powered by one inverter respectively, wherein a power delivered by the permanently excited motor in full-load operation lies in a power range, which lies from 100% to 150% in respect of the power, which is delivered by the further motor selected from the group comprising asynchronous motor and reluctance motor.

Preferably, the permanently excited motor can be powered by an inverter having a power semiconductor which has a wider band gap than silicon and the further motor, selected from the group comprising asynchronous motor and reluctance motor, can be powered by an Si inverter.

In summary, the various features and combination of features result in a particularly effective conservation of energy and an optimum sparing of the components.

Other features which are considered as characteristic of the invention are set forth in the appended claims.

Although the invention is illustrated and described herein as embodied in an electric drive system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE FIGURE

The sole FIGURE of the drawing is a side view of an articulated train having an electric drive system according to an embodiment of the present invention.

DETAILED DESCRIPTION OF THE INVENTION

The FIGURE shows an inventive suburban railroad articulated train 1 having four train elements 2a, 2b, 2c, 2d. A first train element 2a and a second train element 2b arranged next to it on its right-hand side are supported on a first shared bogey 3a. The second train element 2b and a third train element 2c arranged next to it are supported on a second shared bogey 3b. The third train element 2c and a fourth train element 2d arranged next to it to the right in the FIGURE are supported on a third shared bogey 3c. The bogies 3a, 3b, 3c are also referred to as Jacobs bogies.

The first train element 2a, arranged on the far left in the FIGURE, is supported at a first end face 4a of the articulated train 1 on a first separate bogey 5a. The fourth train element 2d, arranged on the far right, is supported at a second end face 4b of the articulated train 1 on a second separate bogey 5b.

Each bogey 3a, 3b, 3c, 5a, 5b comprises a pair of wheelsets. Each wheelset comprises two mutually opposing wheels, which can be moved along a rail (illustrated). Each bogey 3a, 3b, 3c, 5a, 5b accordingly comprises four wheels. Bogies/undercarriages 3a, 3b, 3c, 5a, 5b, which have more or fewer wheels or wheelsets respectively, can also be provided within the framework of the invention.

A drive system 6 of the articulated train 1 comprises asynchronous motors and/or reluctance motors 7a, 7b, which are arranged in a region of the two separate bogies 5a, 5b of the first or fourth train element 2a, 2d and which drive the respectively associated wheels.

The drive system 6 of the articulated train 1 also comprises permanent magnet-excited motors 7c, 7d, which are arranged in a region of the first shared bogey 3a between the first train element 2a and the second train element 2b, and in a region of the third shared bogey 3c between the third train element 2c and the fourth train element 2d. No drive motor is arranged in the second shared bogey 3b.

According to the invention it is provided, moreover, that the permanently excited motors 7c, 7d are powered by one inverter 8c, 8d respectively whose semiconductor has a band gap wider than the band gap of silicon, for example which has a band gap of 1.3 eV, and asynchronous motors and/or reluctance motors 7a, 7b are powered by an Si-based inverter 8a, 8b.

It will be understood that, logically, the described drive system is also suitable for other motorization variants and vehicle types for short-haul and long-haul transport, such as single car trains (two, usually two-axle, undercarriages per railcar body), power cars, four-axle and six-axle locomotives and streetcars.

In the case of the drive system 6, the drive components are used energy-efficiently, within the boundaries of their physical properties, in an operational cycle with full load, partial-load and rolling phases. Mathematically proven possible savings in the range of 5%-10% result, based on the losses of the entire drive system 6, comprising a transformer, an input rectifier (four-quadrant chopper 4QS), a power converter, electric machines, a gear unit, compared to an identical vehicle having only technology comprising asynchronous motors. This optimum use of asynchronous motors/reluctance motors and permanently excited motors on a vehicle is closely in line, in the case of the total losses, with a vehicle having solely the more expensive permanent excitation technology. The difference, merely by way of example, is 0.5-2%. This is an operational cycle-dependent optimization.

The invention claimed is:

1. An electric drive system for a rail vehicle, the drive system comprising:
a plurality of drive motors, including at least one permanently excited motor and at least one further motor selected from the group consisting of an asynchronous motor and a reluctance motor;
an inverter for powering said permanently excited motor, said inverter having a power semiconductor with a band gap wider than a band gap of silicon; and
an Si inverter for powering said further motor selected from the group consisting of the asynchronous motor and the reluctance motor;
wherein a power distribution of the drive motors is set as a function of at least one parameter selected from the group consisting of an anticipated route parameter, and environmental parameter, and an operating parameter; and
wherein a power delivered by said permanently excited motor in full-load operation amounts to between 100% and 150% relative to a power delivered by said further motor selected from the group consisting of said asynchronous motor and said reluctance motor.

2. The electric drive system according to claim 1, wherein the route parameter, the environmental parameter, or the operating parameter is selected from a list comprising an elevation profile of the route, a proportion of individual movement phases of the operational cycle, an anticipated load due to a weight of the vehicle, ambient conditions, environmental conditions, and timetable adherence.

3. The electric drive system according to claim 1, wherein all of said drive motors at full load provide an equal power with an uncertainty of 5%, based on a greatest value.

4. The electric drive system according to claim 1, wherein said inverter is configured to power said further motors comprising asynchronous motors in parallel.

5. The electric drive system according to claim 1, wherein a power distribution of said at least one permanently excited motor and said at least one further motor is controlled on a basis of a specified efficiency matrix.

6. The electric drive system according to claim 1, wherein said inverter for powering said at least one permanently excited motor is an inverter selected from the group consisting of an SiC-based inverter, a diamond inverter, and a GaN-based inverter.

7. A power train for a rail vehicle, the power train comprising an electric drive system for driving at least one wheel or a wheelset axle, said drive system being the electric drive system according to claim 1.

8. A rail vehicle, comprising at least one wheel or a wheelset and a power train with an electric drive system according to claim 1 for driving the at least one wheel or a wheelset axle.

9. A method of operating an electric drive system having a plurality of drive motors, the method comprising:
- providing the drive system with at least one permanently excited motor as a drive motor and at least one further motor selected from the group consisting of an asynchronous motor and a reluctance motor as a drive motor;
- powering the drive motors of the drive system with respective inverter; and
- powering the permanently excited motor by an inverter having a power semiconductor with a band gap that is greater than a band gap of silicon and powering the further motor selected from the group consisting of the asynchronous motor and the reluctance motor by an Si-based inverter; and
- operating the drive system such that a power delivered by the permanently excited motor in full-load operation lies in a power range from 100% to 150% relative to a power delivered by the further motor selected from the group consisting of the asynchronous motor and the reluctance motor.

* * * * *